United States Patent
Deshpande et al.

(10) Patent No.: US 12,373,579 B2
(45) Date of Patent: Jul. 29, 2025

(54) DATA PROCESSING AND STORAGE USING QUANTUM AND DNA COMPUTING

(71) Applicant: Bank of America Corporation, Charlotte, NC (US)

(72) Inventors: Nimish Ravindra Deshpande, East Mumbai (IN); Prashant Anna Bidkar, Shakarpur (IN); Sachin Ahuja, New Delhi (IN); Vibhuti Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 18/053,958

(22) Filed: Nov. 9, 2022

(65) Prior Publication Data
US 2024/0152629 A1 May 9, 2024

(51) Int. Cl.
*G06F 21/60* (2013.01)
*G06N 3/123* (2023.01)
*G06N 10/40* (2022.01)

(52) U.S. Cl.
CPC .......... *G06F 21/602* (2013.01); *G06N 3/123* (2013.01); *G06N 10/40* (2022.01)

(58) Field of Classification Search
CPC ...... G06F 21/602; G06N 3/123; G06N 10/40; G06N 10/00
See application file for complete search history.

(56) References Cited

U.S. PATENT DOCUMENTS

| | | | |
|---|---|---|---|
| 8,145,677 B2 | 3/2012 | Al-Shameri | |
| 8,158,359 B2 | 4/2012 | Leamon et al. | |
| 8,266,121 B2 | 9/2012 | Roitblat et al. | |
| 8,468,244 B2 | 6/2013 | Redlich et al. | |
| 10,049,179 B2 | 8/2018 | Van Rooyen et al. | |
| 10,657,451 B2 | 5/2020 | Thomas et al. | |
| 10,917,109 B1 * | 2/2021 | Dimopoulou | H03M 7/3088 |
| 10,970,887 B2 | 4/2021 | Wang et al. | |
| 11,164,677 B1 * | 11/2021 | Harris | G16H 50/50 |
| 11,526,795 B1 * | 12/2022 | McMahon | G06N 20/00 |
| 12,051,005 B2 * | 7/2024 | Ronagh | G06F 9/45504 |
| 2002/0152191 A1 | 10/2002 | Hollenberg et al. | |
| 2005/0273306 A1 | 12/2005 | Hilton et al. | |

(Continued)

*Primary Examiner* — Taghi T Arani
*Assistant Examiner* — Blake I Narramore

(57) ABSTRACT

A system and method for data processing and storage using quantum and deoxyribonucleic acid (DNA) computing. The method includes receiving a request for a search data item. The request includes a first information represented by classical binary bits. The request is converted into a converted request. The converted request includes the first information represented by quantum bits. One or more servers are searched based on the converted request using a quantum search algorithm. Search results are generated. The search results are ranked according to ranking rules. A highest-ranked result includes a second information represented by quantum bits. The highest-ranked result is converted to a converted highest-ranked result. The converted highest-ranked result includes the second information represented by DNA bits. The converted highest-ranked result is encrypted to generate an encrypted and converted highest-ranked result. The encrypted and converted highest-ranked result is stored in one or more DNA strands.

18 Claims, 2 Drawing Sheets

(56) References Cited

U.S. PATENT DOCUMENTS

| | | | |
|---|---|---|---|
| 2007/0239366 | A1 | 10/2007 | Hilton et al. |
| 2017/0223094 | A1* | 8/2017 | Johnson ................. G06N 10/00 |
| 2018/0121601 | A1 | 5/2018 | Hahm et al. |
| 2018/0240032 | A1 | 8/2018 | Van Rooyen |
| 2019/0311782 | A1* | 10/2019 | Dai ....................... G06F 16/258 |
| 2019/0370164 | A1* | 12/2019 | Goldman ............. G06F 12/023 |
| 2020/0034347 | A1 | 1/2020 | Selly |
| 2020/0183938 | A1* | 6/2020 | Hu ......................... G06N 10/80 |
| 2020/0327421 | A1* | 10/2020 | Bathe ..................... G06N 3/002 |
| 2020/0400957 | A1* | 12/2020 | Van Heugten ..... G02B 27/0172 |
| 2020/0407697 | A1* | 12/2020 | Shepherd ................. C12Q 1/68 |
| 2021/0019556 | A1 | 1/2021 | Ganguly |
| 2021/0133881 | A1 | 5/2021 | Egger et al. |
| 2021/0142866 | A1* | 5/2021 | Zhang ..................... G16B 25/00 |
| 2022/0172096 | A1* | 6/2022 | Rudolph ............. G02B 6/12019 |
| 2022/0284304 | A1* | 9/2022 | Nemati ................. H03M 13/23 |
| 2022/0300843 | A1* | 9/2022 | Rahmes ................. G06F 15/82 |
| 2023/0021229 | A1* | 1/2023 | Zimmermann ....... H04L 9/3239 |
| 2023/0259577 | A1* | 8/2023 | Susa ...................... G06N 10/00 |
| | | | 708/200 |

\* cited by examiner

DATA PROCESSING AND STORAGE USING QUANTUM AND DNA COMPUTING

TECHNICAL FIELD

The present disclosure relates generally to data processing and storage, and more specifically to a system and method for data processing and storage using quantum and deoxyribonucleic acid (DNA) computing.

BACKGROUND

The process of determining ultimate beneficial owner (UBO) information for an entity includes searching unstructured data stored in one or more servers and storing search results in a data storage system. Current search and storage methods used for determining the UBO information may not provide a desired search speed and data density.

SUMMARY

The system described in the present disclosure provides several practical applications and technical advantages that overcome the current technical problems as described herein. The following disclosure is particularly integrated into practical applications of: (1) improving a search speed of a computer system; and (2) improving a data density of a storage system.

The disclosed system is configured to receive a request to search for a search data item and perform a search process using a quantum processor executing a quantum search algorithm. By using the quantum processor, a speed of the search process is increased due to quantum parallelization. The disclosed system is further configured to store search results in DNA strands stored in a DNA storage system. By storing the search results in DNA strands, a data density of the storage system is improved.

In one embodiment, an apparatus includes a first converter system. The first converter system includes a first processor. The first processor is configured to receive a request for a search data item and convert the request into a converted request. The request includes a first information represented by classical binary bits. The converted request includes the first information represented by quantum bits. The apparatus further includes a quantum computing system communicatively coupled to the first converter system. The quantum computing system includes a quantum processor. The quantum processor is configured to receive the converted request, search one or more servers based on the converted request, generate search results, and rank the search results according to ranking rules. The apparatus further includes a second converter system communicatively coupled to the quantum computing system. The second converter system includes a second processor. The second processor is configured to receive a highest-ranked result of the search results and convert the highest-ranked result to a converted highest-ranked result. The highest-ranked result includes a second information represented by quantum bits. The converted highest-ranked result includes the second information represented by DNA bits. The apparatus further includes a DNA computing system communicatively coupled to the second converter. The DNA computing system includes a third processor. The third processor is configured to receive the converted highest-ranked result and encrypt the converted highest-ranked result to generate an encrypted and converted highest-ranked result. The DNA computing system further includes a DNA storage communicatively coupled to the third processor. The DNA storage is configured to store the encrypted and converted highest-ranked result in one or more DNA strands.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
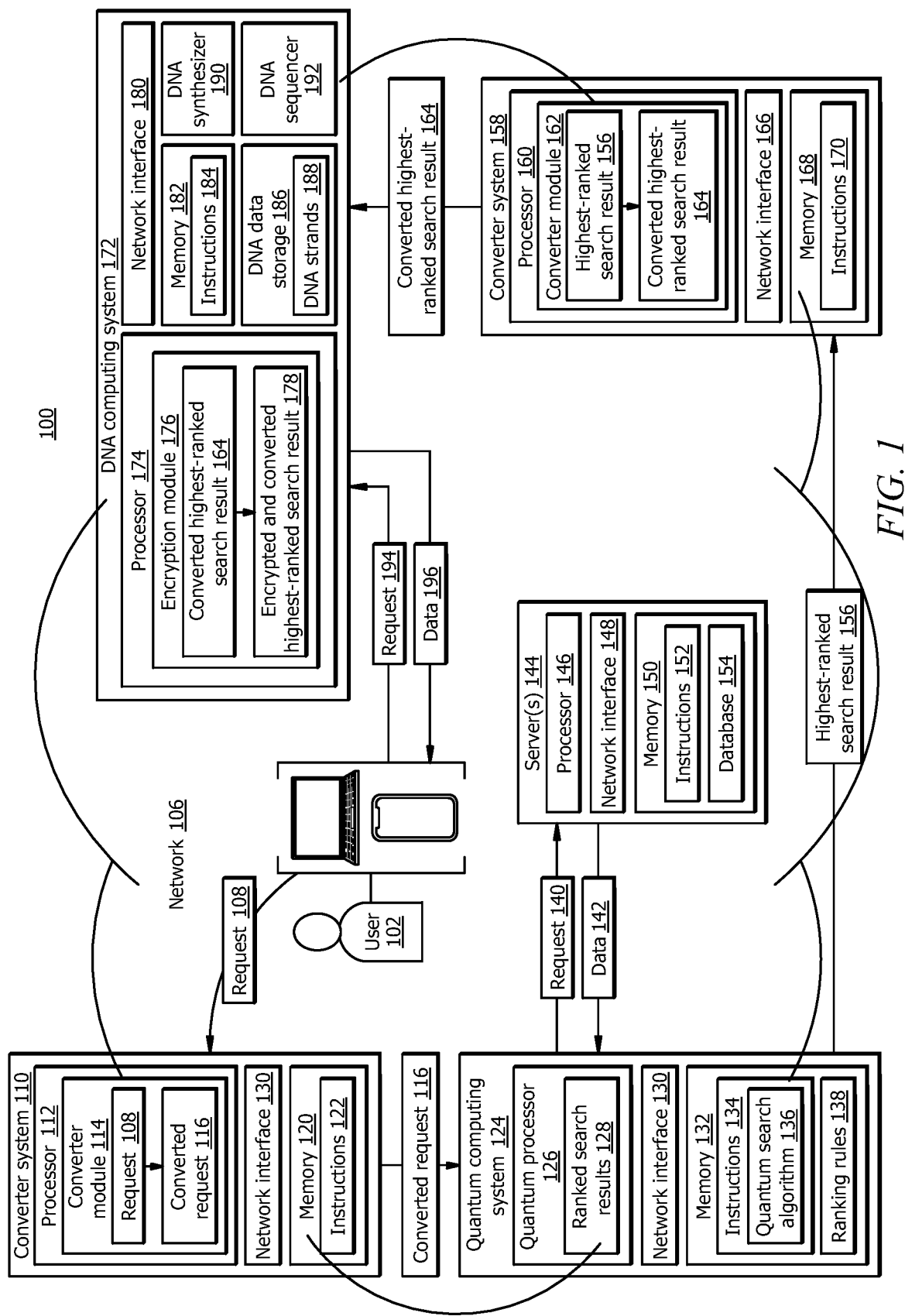
FIG. 1 illustrates an embodiment of a system configured to process and store data using quantum and DNA computing.
Figure 2:
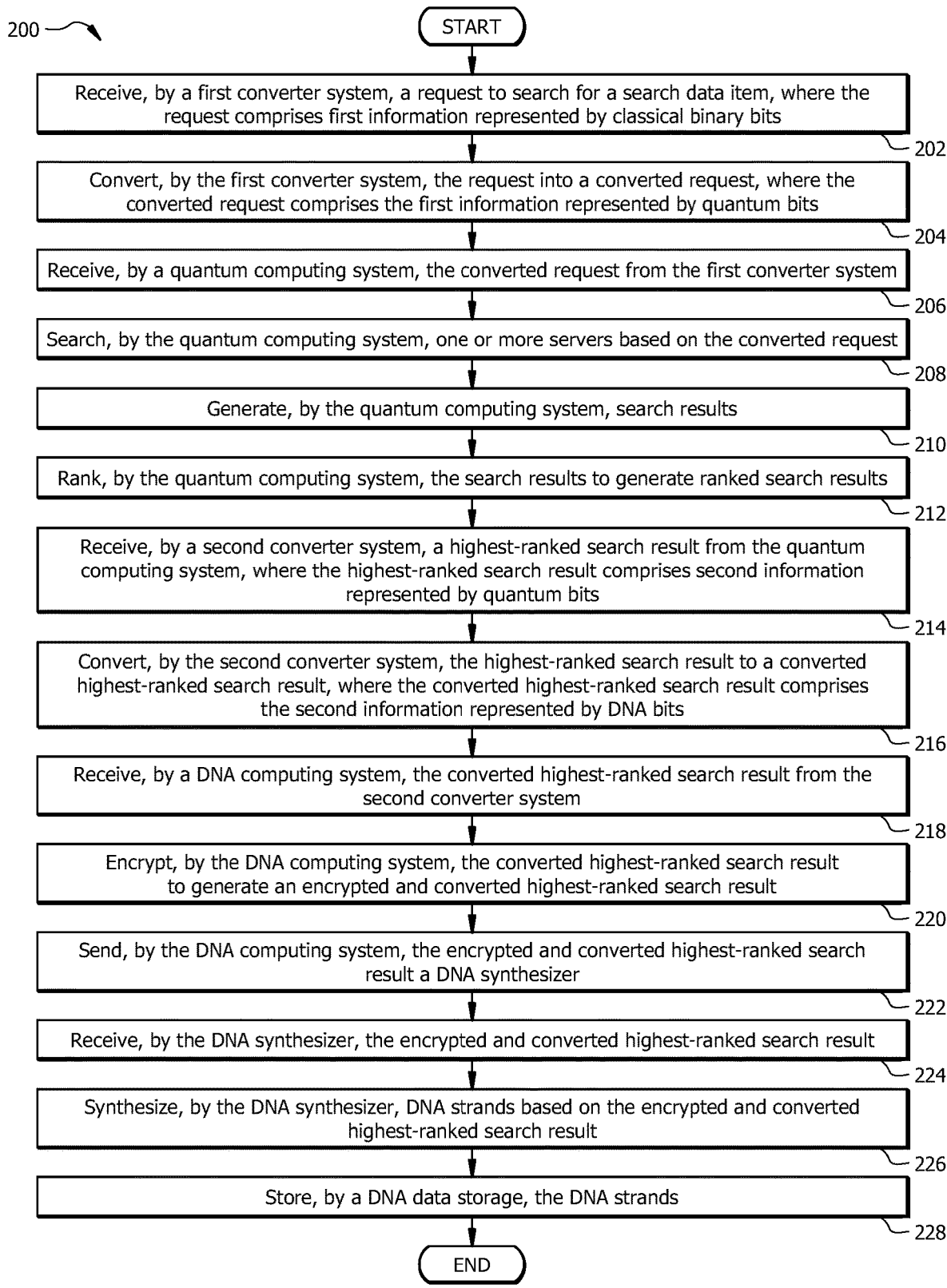
FIG. 2 illustrates an example operational flow of system of FIG. 1 for data processing and storage using quantum and DNA computing.

As described above, previous technologies fail to provide efficient solutions to process and store data. Embodiments of the present disclosure and its advantages may be understood by referring to FIGS. 1 and 2. FIGS. 1 and 2 are used to describe a system and method for data processing and storage using quantum and DNA computing.

System Overview

FIG. 1 illustrates an embodiment of a system 100 that is generally configured to process and store data using quantum and DNA computing. In particular, the system 100 may be configured to determine ultimate beneficial owner (UBO) information of an entity using quantum computing and store the UBO information in a DNA data storage. The entity may be an organization, a company, a business, or the like.

In certain embodiments, the system 100 comprises converter systems 110 and 158, a quantum computing system 124, and a DNA computing system 172 that are operably coupled via a network 106. Network 106 enables the communication between the components of the system 100. The system 100 may be coupled to a computing device 104 of a user 102 and to one or more servers 144 via the network 106. In other embodiments, system 100 may not have all the components listed and/or may have other elements instead of, or in addition to, those listed above. For example, the converter systems 110 and 158 may be implemented as a single converter system. As another example, the converter system 110 may be integrated into the quantum computing system 124. As yet another example, the converter system 158 may be integrated into the DNA computing system 172. In certain embodiments, all components of system 100 may be integrated into a single system, with the single system including at least one classical processor and at least one quantum processor.

System Components

Network

Network 106 may be any suitable type of wireless and/or wired network. The network 106 may or may not be connected to the Internet or public network. The network 106 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 106 may be configured to support any suitable type of communication protocol as would be appreciated by one of ordinary skill in the art.

Computing Device

Computing device 104 is generally any device that is configured to process data and interact with a user 102. Examples of the computing device 104 include, but are not limited to, a personal computer, a desktop computer, a workstation, a server, a laptop, a tablet computer, a mobile phone (such as a smartphone), etc. The computing device 104 may include a user interface, such as a display, a microphone, keypad, or other appropriate terminal equipment usable by the user 102. The computing device 104 may include a hardware processor, memory, and/or circuitry (not explicitly shown) configured to perform any of the functions or actions of the computing device 104 described herein. For example, a software application designed using software code may be stored in the memory and executed by the processor to perform the functions of the computing device 104. The computing device 104 is configured to communicate with other components of the system 100 via the network 106, such as the converter system 110. The user 102 may initiate one or more data processing tasks from the computing device 104 by communicating a request 108 to the converter system 110. For example, the computing device 104 may initiate a task for determining ultimate beneficial owner (UBO) information of an entity. In such embodiments, the request 108 may comprise a request to search for a search data item. The search data item may comprise ownership information for the entity, stock exchange listing information for the entity, and/or materially negative news for the entity.

Classical Bits to Quantum Bits Converter System

Converter system 110 is generally any device that is configured to process data and communicate with other components of the system 100 via the network 106. Converter system 110 comprises a processor 112 in signal communication with a memory 120 and a network interface 118.

Processor 112 comprises one or more processors operably coupled to the memory 120. The processor 112 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 112 may be a programmable logic device, a microcontroller, a microprocessor, or any suitable combination of the preceding. The one or more processors are configured to process data and may be implemented in hardware or software. For example, the processor 112 may be 8-bit, 16-bit, 32-bit, 64-bit, or of any other suitable architecture. The one or more processors are configured to implement various software instructions to perform the operations described herein. For example, the one or more processors are configured to execute software instructions 122 to perform one or more functions of the converter system 110 described herein. The processor 112 may be also referred to as a classical computer.

Network interface 118 is configured to enable wired and/or wireless communications (e.g., via network 106). The network interface 118 is configured to communicate data between the converter system 110 and other components of the system 100. For example, the network interface 118 may comprise a WIFI interface, a local area network (LAN) interface, a wide area network (WAN) interface, a modem, a switch, or a router. The processor 112 is configured to send and receive data using the network interface 118. The network interface 118 may be configured to use any suitable type of communication protocol as would be appreciated by one of ordinary skill in the art.

Memory 120 may be volatile or non-volatile and may comprise a read-only memory (ROM), random-access memory (RAM), ternary content-addressable memory (TCAM), dynamic random-access memory (DRAM), and static random-access memory (SRAM). Memory 120 may be implemented using one or more disks, tape drives, solid-state drives, and/or the like. The memory 120 is operable to store software instructions 122, and/or any other data and instructions. The software instructions 122 may comprise any suitable set of software instructions, logic, rules, or code operable to be executed by the processor 112 to perform one or more functions of the converter system 110 described herein. In certain embodiments, the processor 112, when executing the software instructions 122, implements a converter module 114.

In certain embodiments, the converter system 110 may be configured as a classical binary bits-to-quantum bits (qubits) converter, such that the converter system 110 converts data that is encoded by classical binary bits to converted data that is encoded by quantum bits using the converter module 114. In the illustrated embodiment, the converter system 110 is configured to receive the request 108 from the computing device 104 of the user 102 and convert the request 108 that is encoded by classical binary bits to a converted request 116 that is encoded by quantum bits. As such, the request 108 and the converted request 116 comprise same information, but encoded by classical and quantum bits, respectively. The converter system 110 is further configured to communicate the converted request 116 to the quantum computing system 124.

Quantum Computing System

Quantum computing system 124 comprises a quantum processor 126 in signal communication with a memory 132 and a network interface 130. Quantum processor 126 may comprise one or more quantum processors operably coupled to the memory 132. The quantum processor 126 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements qubits with states of a respective quantum system.

Network interface 130 is configured to enable wired and/or wireless communications (e.g., via network 106). The network interface 130 is configured to communicate data between the quantum computing system 124 and other components of the system 100. For example, the network interface 130 may comprise a WIFI interface, a local area network (LAN) interface, a wide area network (WAN) interface, a modem, a switch, or a router. The quantum processor 126 is configured to send and receive data using the network interface 130. The network interface 130 may be configured to use any suitable type of communication protocol as would be appreciated by one of ordinary skill in the art.

Memory 132 may be volatile or non-volatile and may comprise a read-only memory (ROM), random-access memory (RAM), ternary content-addressable memory (TCAM), dynamic random-access memory (DRAM), and static random-access memory (SRAM). Memory 132 may be implemented using one or more disks, tape drives, solid-state drives, and/or the like. The memory 132 is operable to store software instructions 134, and/or any other data and instructions. The software instructions 134 may comprise any suitable set of software instructions, logic, rules, or code operable to be executed by the quantum processor 126 to perform one or more functions of the quantum computing system 124 described herein. In certain embodiments, the software instructions 134 may comprise a quantum search algorithm 136, such as Grover's algorithm. By using the quantum processor 126 instead of the classical processor, speed of the search process is increased.

In certain embodiments, the quantum computing system 124 is configured to receive the converted request 116 from the converter system 110 and perform a search process based on the converted request 116. The quantum computing system 124 may search one or more servers 144 via the network 106. The search process may comprise sending one or more requests 140 to the one or more servers 144 and receive data 142 in response to sending the one or more requests 140. The search process may result in generating search results, which may be ranked according to ranking rules 138 stored in the memory 132 to generate ranked search results 128. The quantum computing system 124 may be further configured to communicate a highest-ranked search result 156 to the converter system 158. In certain embodiments, before performing the search process, the quantum computing system 124 may generate a quantum state based on the converted request 116.

In an embodiment when the converted request 116 comprises a request to search for ownership information for the entity, the one or more servers 144 that are searched may be servers that host regulatory agency websites and databases. In an embodiment when the converted request 116 comprises a request to search for stock exchange listing information for the entity, the one or more servers 144 that are searched may be servers that host various stock exchange websites and databases. In an embodiment when the converted request 116 comprises a request to search for materially negative news for the entity, the one or more servers 144 that are searched may be servers that host news agency websites, newspaper websites, magazine websites, blog websites, social network websites, or other publicly available information associated with the entity.

In certain embodiments, the ranking rules 138 may be used to rank the information obtained from the one or more servers 144 based on the reputability of sources. For example, information obtained from the regulatory agencies, the stock exchanges, and reputable news agencies or outlets may be ranked higher that information obtained from blogs, newsletters, or social networks.

Servers

One or more servers 144 are generally any devices that are configured to process data and communicate with the components of the system 100 via the network 106. Each server 144 comprises a processor 146 in signal communication with a memory 150 and a network interface 148.

Processor 146 comprises one or more processors operably coupled to the memory 150. The processor 146 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 146 may be a programmable logic device, a microcontroller, a microprocessor, or any suitable combination of the preceding. The one or more processors are configured to process data and may be implemented in hardware or software. For example, the processor 146 may be 8-bit, 16-bit, 32-bit, 64-bit, or of any other suitable architecture. The one or more processors are configured to implement various software instructions to perform the operations described herein. For example, the one or more processors are configured to execute software instructions 152 to perform one or more functions of the one or more servers 144 described herein. The processor 146 may be also referred to as a classical computer.

Network interface 148 is configured to enable wired and/or wireless communications (e.g., via network 106). The network interface 148 is configured to communicate data between the server 144 and the components of the system 100. For example, the network interface 148 may comprise a WIFI interface, a local area network (LAN) interface, a wide area network (WAN) interface, a modem, a switch, or a router. The processor 146 is configured to send and receive data using the network interface 148. The network interface 148 may be configured to use any suitable type of communication protocol as would be appreciated by one of ordinary skill in the art.

Memory 150 may be volatile or non-volatile and may comprise a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. The memory 150 is operable to store software instructions 152, and/or any other data and instructions. The software instructions 152 may comprise any suitable set of software instructions, logic, rules, or code operable to be executed by the processor 146 to perform one or more functions of the one or more servers 144 described herein. In certain embodiments, the memory 150 may further comprise a database 154.

In certain embodiments, the one or more servers 144 may be servers that host regulatory agency websites and databases, stock exchange websites and databases, news agency websites, newspaper websites, magazine websites, blog websites, social network websites, and/or other publicly available information.

In the illustrated embodiment, the one or more servers 144 are not components of the system 100 and are external systems. In other embodiments, the one or more servers 144 may be components of the system 100.

Quantum Bits to DNA Bits Converter System

Converter system 158 is generally any device that is configured to process data and communicate with other components of the system 100 via the network 106. Converter system 158 comprises a processor 160 in signal communication with a memory 168 and a network interface 166.

Processor 160 comprises one or more processors operably coupled to the memory 168. The processor 160 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 160 may be a programmable logic device, a microcontroller, a microprocessor, or any suitable combination of the preceding. The one or more processors are configured to process data and may be implemented in hardware or software. For example, the processor 160 may be 8-bit, 16-bit, 32-bit, 64-bit, or of any other suitable architecture. The one or more processors are configured to implement various software instructions to perform the operations described herein. For example, the one or more processors are configured to execute software instructions 170 to perform one or more functions of the converter system 158 described herein. The processor 160 may be also referred to as a classical computer.

Network interface 166 is configured to enable wired and/or wireless communications (e.g., via network 106). The network interface 166 is configured to communicate data between the converter system 158 and other components of the system 100. For example, the network interface 166 may comprise a WIFI interface, a local area network (LAN) interface, a wide area network (WAN) interface, a modem, a switch, or a router. The processor 160 is configured to send and receive data using the network interface 166. The network interface 166 may be configured to use any suitable type of communication protocol as would be appreciated by one of ordinary skill in the art.

Memory 168 may be volatile or non-volatile and may comprise a read-only memory (ROM), random-access memory (RAM), ternary content-addressable memory (TCAM), dynamic random-access memory (DRAM), and static random-access memory (SRAM). Memory 168 may be implemented using one or more disks, tape drives, solid-state drives, and/or the like. The memory 168 is operable to store software instructions 170, and/or any other data and instructions. The software instructions 170 may comprise any suitable set of software instructions, logic, rules, or code operable to be executed by the processor 160 to perform one or more functions of the converter system 158 described herein. In certain embodiments, the processor 160, when executing the software instructions 170, implements a converter module 162.

In certain embodiments, the converter system 158 may be configured as a quantum bits-to-DNA bits converter, such that the converter system 158 converts data that is encoded by quantum bits to converted data that is encoded by DNA bits using the converter module 162 of the processor 160. The DNA bits comprise letters A, C, G, and T that correspond to nucleotides adenine, cytosine, guanine, and thymine, respectively.

In the illustrated embodiment, the converter system 158 is configured to receive the highest-ranked search result 156 from the quantum computing system 124 and convert the highest-ranked search result 156 that is encoded by quantum bits to a converted highest-ranked search result 164 that is encoded by DNA bits. As such, the highest-ranked search result 156 and the converted highest-ranked search result 164 comprise same information, but encoded by quantum and DNA bits, respectively. The converter system 158 is further configured to communicate the converted highest-ranked search result 164 to the DNA computing system 172.

DNA Computing System

DNA computing system 172 is configured to process and store data, and to communicate with other components of the system 100 via the network 106. DNA computing system 172 comprises a processor 174 in signal communication with a memory 182 and a network interface 180.

Processor 174 comprises one or more processors operably coupled to the memory 182. The processor 174 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 174 may be a programmable logic device, a microcontroller, a microprocessor, or any suitable combination of the preceding. The one or more processors are configured to process data and may be implemented in hardware or software. For example, the processor 174 may be 8-bit, 16-bit, 32-bit, 64-bit, or of any other suitable architecture. The one or more processors are configured to implement various software instructions to perform the operations described herein. For example, the one or more processors are configured to execute software instructions 184 to perform one or more functions of the DNA computing system 172 described herein. The processor 174 may be also referred to as a classical computer.

Network interface 180 is configured to enable wired and/or wireless communications (e.g., via network 106). The network interface 180 is configured to communicate data between the DNA computing system 172 and other components of the system 100. For example, the network interface 180 may comprise a WIFI interface, a local area network (LAN) interface, a wide area network (WAN) interface, a modem, a switch, or a router. The processor 174 is configured to send and receive data using the network interface 180. The network interface 180 may be configured to use any suitable type of communication protocol as would be appreciated by one of ordinary skill in the art.

Memory 182 may be volatile or non-volatile and may comprise a read-only memory (ROM), random-access memory (RAM), ternary content-addressable memory (TCAM), dynamic random-access memory (DRAM), and static random-access memory (SRAM). Memory 182 may be implemented using one or more disks, tape drives, solid-state drives, and/or the like. The memory 182 is operable to store software instructions 184, and/or any other data and instructions. The software instructions 184 may comprise any suitable set of software instructions, logic, rules, or code operable to be executed by the processor 174 to perform one or more functions of the DNA computing system 172 described herein. In certain embodiments, the processor 174, when executing the software instructions 184, implements an encryption module 176.

In certain embodiments, the DNA computing system 172 is configured to receive the converted highest-ranked search result 164 from the converter system 158 and perform an encryption process to generate an encrypted and converted highest-ranked search result 178. In certain embodiments, the encryption process may be performed by the encryption module 176 that implements an AES encryption algorithm for performing the encryption process.

The DNA computing system 172 may further comprise a DNA storage system 186, a DNA synthesizer 190, and a DNA sequencer 192. The DNA storage system 186 is configured to store data using DNA strands 188. The DNA synthesizer 190 receives encrypted and converted highest-ranked search result 178 and synthesizes one or more DNA strands 188 based on the encrypted and converted highest-ranked search result 178. In certain embodiments, nucleotides of a DNA strand 188 may be arranged in a similar manner as DNA bits in the encrypted and converted highest-ranked search result 178. The DNA sequencer 192 may be used to retrieve the information from the DNA strands 188, such that the retrieved information is represented by DNA bits. By storing the encrypted and converted highest-ranked search results in DNA strands, a data density of the storage system is improved.

In certain embodiments, the DNA computing system 172 is configured to receive a request 194 from the computing device 104 of the user 102 and provide data 196 to computing device 104 of the user 102 in response to receiving the request 194. The request 194 may comprise a request for providing UBO information for a desired entity. After receiving the request 194, the DNA sequencer 192 may extract encrypted data from respective DNA strands 188. The encrypted data is decrypted by the encryption module 176 and is then communicated to the computing device 104 as data 196.

Example Method for Data Processing and Storage Using Quantum and DNA Computing

FIG. 2 illustrates an example flowchart of a method 200 for data processing and storage using quantum and DNA computing. Modifications, additions, or omissions may be made to method 200. Method 200 may include more, fewer, or other operations. For example, operations may be performed in parallel or in any suitable order. For example, one or more operations of method 200 may be implemented, at least in part, in the form of software instructions (e.g., instructions 122, 134, 170, and 184 of FIG. 1), stored on non-transitory, tangible, machine-readable medium (e.g., memories 120, 132, 168, and 182 of FIG. 1) that when executed by one or more processors (e.g., processors 112, 126, 160, and 174 of FIG. 1) may cause the one or more processors to perform operations 202-222.

At operation 202, a first converter system (e.g., converter system 110 of FIG. 1) receives a request (e.g., request 108 of FIG. 1) to search for a search data item. The request comprises first information represented by classical binary bits. In embodiments when the request initiates a task for determining ultimate beneficial owner (UBO) information of an entity, the search data item may comprise ownership information for the entity, stock exchange listing information for the entity, and/or materially negative news for the entity.

At operation 204, the first converter system converts the request into a converted request (e.g., converted request 116 of FIG. 1), where the converted request comprises the first information represented by quantum bits.

At operation 206, a quantum computing system (e.g., quantum computing system 124 of FIG. 1) receives the converted request from the first converter system. In certain embodiments, the quantum computing system may generate a quantum state based on the converted request.

At operation 208, the quantum computing system searches one or more servers based on the converted request. In an embodiment when the converted request comprises a request to search for ownership information for the entity, the one or more servers that are searched may be servers that host regulatory agency websites and databases. In an embodiment when the converted request comprises a request to search for stock exchange listing information for the entity, the one or more servers that are searched may be servers that host various stock exchange websites and databases. In an embodiment when the converted request comprises a request to search for materially negative news for the entity, the one or more servers that are searched may be servers that host news agency websites, newspaper websites, magazine websites, blog websites, social network websites, and/or other publicly available information associated with the entity.

At operation 210, the quantum computing system generates search results.

At operation 212, the quantum computing system ranks the search results to generate ranked search results (e.g., ranked search results 128 of FIG. 1). The ranking process may be performed according to ranking rules (e.g., ranking rules 138 of FIG. 1). In certain embodiments, the ranking rules may rank the search results based on the reputability of sources. For example, search results obtained from the regulatory agencies, the stock exchanges, and reputable news agencies, or outlets may be ranked higher that search results obtained from blogs, newsletters, or social networks.

At operation 214, a second converter system (e.g., converter system 158 of FIG. 1) receives a highest-ranked search result (e.g., highest-ranked search result 156 of FIG. 1) from the quantum computing system, where the highest-ranked search result comprises second information represented by quantum bits.

At operation 216, the second converter system converts the highest-ranked search result to a converted highest-ranked search result (e.g., converted highest-ranked search result 164 of FIG. 1), where the converted highest-ranked search result comprises the second information represented by DNA bits. The DNA bits comprise letters A, C, G, and T that correspond to nucleotides adenine, cytosine, guanine, and thymine, respectively.

At operation 218, a DNA computing system (e.g., DNA computing system 172 of FIG. 1) receives the converted highest-ranked search result from the second converter system.

At operation 220, the DNA computing system encrypts the converted highest-ranked search result to generate an encrypted and converted highest-ranked search result (e.g., encrypted and converted highest-ranked search result 178 of FIG. 1).

At operation 222, the DNA computing system sends the encrypted and converted highest-ranked search result to a DNA synthesizer (e.g., DNA synthesizer 190 of FIG. 1).

At operation 224, the DNA synthesizer receives the encrypted and converted highest-ranked search result.

At operation 226, the DNA synthesizer synthesizes DNA strands (e.g., DNA strands 188 of FIG. 1) based on the encrypted and converted highest-ranked search result.

At operation 228, a DNA data storage stores the DNA strands.

The method 200 provides one or more advantages. By using the quantum search algorithm, a speed of the search process is increased due to quantum parallelization. By storing the search results in DNA strands, a data density of the storage system is improved. Accordingly, the method 200 is integrated into practical applications of: (1) improving a search speed of a computer system; and (2) improving a data density of a storage system.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
a first converter system, wherein the first converter system comprises:
  a first processor configured to:
    receive a request for a search data item, wherein the request comprises a first information represented by classical binary bits; and
    convert the request into a converted request, wherein the converted request comprises the first information represented by quantum bits;
a quantum computing system communicatively coupled to the first converter system, wherein the quantum computing system comprises:
  a quantum processor configured to:
    receive the converted request;
    search one or more servers based on the converted request;
    generate search results; and
    rank the search results according to ranking rules;
a second converter system communicatively coupled to the quantum computing system, wherein the second converter system comprises:
  a second processor configured to:
    receive a highest-ranked result of the search results, wherein the highest-ranked result comprises a second information represented by quantum bits; and
    convert the highest-ranked result from quantum bits to a converted highest-ranked result, wherein the converted highest-ranked result comprises the second information represented by deoxyribonucleic acid (DNA) bits; and
a DNA computing system communicatively coupled to the second converter, wherein the DNA computing system comprises:
  a third processor configured to:
    receive the converted highest-ranked result; and
    encrypt the converted highest-ranked result to generate an encrypted and converted highest-ranked result;
  a DNA synthesizer configured to:
    receive the encrypted and converted highest-ranked result; and
    in response to receiving the encrypted and converted highest-ranked result, synthesize one or more DNA strands in accordance with the encrypted and converted highest-ranked result, the one or more DNA strands being synthesized so as to arrange each nucleotide of the one or more DNA strands in accordance with an arrangement of the DNA bits within the encrypted and converted highest-ranked result; and
  a DNA storage communicatively coupled to the third processor, wherein the DNA storage is configured to:
    store the encrypted and converted highest-ranked result in the one or more DNA strands.

2. The apparatus of claim 1, wherein the quantum computing system is configured to generate a quantum state based on the converted request.

3. The apparatus of claim 1, wherein the search data item comprises owner information for an entity, stock exchange listing information for the entity, or negative information for the entity.

4. The apparatus of claim 1, wherein the quantum processor implements Grover's algorithm.

5. The apparatus of claim 1, wherein the DNA bits comprise letters A, C, G, and T corresponding to adenine, cytosine, guanine, and thymine, respectively.

6. The apparatus of claim 1, wherein the one or more servers host regulatory agency websites and databases, stock exchange websites and databases, news agency websites, newspaper websites, magazine websites, blog websites, and/or social network websites.

7. A method comprising:
receiving a request for a search data item, wherein the request comprises a first information represented by classical binary bits;
converting the request into a converted request, wherein the converted request comprises the first information represented by quantum bits;
searching, using a quantum search algorithm, one or more servers based on the converted request;
generating search results;
ranking the search results according to ranking rules, wherein a highest-ranked result comprises a second information represented by quantum bits;
converting the highest-ranked result from quantum bits to a converted highest-ranked result, wherein the converted highest-ranked result comprises the second information represented by deoxyribonucleic acid (DNA) bits;
encrypting the converted highest-ranked result to generate an encrypted and converted highest-ranked result;
receiving the encrypted and converted highest-ranked result;
in response to receiving the encrypted and converted highest-ranked result, synthesizing one or more DNA strands in accordance with the encrypted and converted highest-ranked result, the one or more DNA strands being synthesized so as to arrange each nucleotide of the one or more DNA strands in accordance with an arrangement of the DNA bits within the encrypted and converted highest-ranked result; and
storing the encrypted and converted highest-ranked result in the one or more DNA strands.

8. The method of claim 7, further comprising:
generating a quantum state based on the converted request.

9. The method of claim 7, wherein the search data item comprises owner information for an entity, stock exchange listing information for the entity, or negative information for the entity.

10. The method of claim 7, wherein the quantum search algorithm comprises Grover's algorithm.

11. The method of claim 7, wherein the DNA bits comprise letters A, C, G, and T corresponding to adenine, cytosine, guanine, and thymine, respectively.

12. The method of claim 7, wherein the one or more servers host regulatory agency websites and databases, stock exchange websites and databases, news agency websites, newspaper websites, magazine websites, blog websites, and/or social network websites.

13. A non-transitory computer-readable medium storing instructions that, when executed by one or more processors, cause the one or more processors to:
- receive a request for a search data item, wherein the request comprises a first information represented by classical binary bits;
- convert the request into a converted request, wherein the converted request comprises the first information represented by quantum bits;
- search, using a quantum search algorithm, one or more servers based on the converted request;
- generate search results;
- rank the search results according to ranking rules, wherein a highest-ranked result comprises a second information represented by quantum bits;
- convert the highest-ranked result from quantum bits to a converted highest-ranked result, wherein the converted highest-ranked result comprises the second information represented by deoxyribonucleic acid (DNA) bits;
- encrypt the converted highest-ranked result to generate an encrypted and converted highest-ranked result;
- receive the encrypted and converted highest-ranked result;
- in response to receiving the encrypted and converted highest-ranked result, synthesize one or more DNA strands in accordance with the encrypted and converted highest-ranked result, the one or more DNA strands being synthesized so as to arrange each nucleotide of the one or more DNA strands in accordance with an arrangement of the DNA bits within the encrypted and converted highest-ranked result; and
- store the encrypted and converted highest-ranked result in the one or more DNA strands.

14. The non-transitory computer-readable medium of claim 13, wherein the search data item comprises owner information for an entity, stock exchange listing information for the entity, or negative information for the entity.

15. The non-transitory computer-readable medium of claim 13, wherein the quantum search algorithm comprises Grover's algorithm.

16. The non-transitory computer-readable medium of claim 13, wherein the DNA bits comprise letters A, C, G, and T corresponding to adenine, cytosine, guanine, and thymine, respectively.

17. The non-transitory computer-readable medium of claim 13, wherein the one or more servers host regulatory agency websites and databases, stock exchange websites and databases, news agency websites, newspaper websites, magazine websites, blog websites, and/or social network websites.

18. The non-transitory computer-readable medium of claim 13, wherein at least one of the one or more processors is a quantum processor.

* * * * *